United States Patent
Yu et al.

(10) Patent No.: US 10,111,211 B2
(45) Date of Patent: Oct. 23, 2018

(54) RELAY RECEPTION SYNCHRONIZATION SYSTEM AND METHOD

(75) Inventors: Yi Yu, Irving, TX (US); Zhijun Cai, Irving, TX (US); James Earl Womack, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 12/722,412

(22) Filed: Mar. 11, 2010

(65) Prior Publication Data

US 2010/0232346 A1    Sep. 16, 2010

Related U.S. Application Data

(60) Provisional application No. 61/160,158, filed on Mar. 13, 2009, provisional application No. 61/160,156, filed on Mar. 13, 2009, provisional application No. 61/160,163, filed on Mar. 13, 2009.

(51) Int. Cl.
| | |
|---|---|
| *H04W 72/04* | (2009.01) |
| *H04L 5/00* | (2006.01) |
| *H04B 7/26* | (2006.01) |
| *H04W 84/04* | (2009.01) |
| *H04W 88/04* | (2009.01) |

(52) U.S. Cl.
CPC ....... *H04W 72/0413* (2013.01); *H04L 5/0053* (2013.01); *H04W 72/042* (2013.01); *H04B 7/2606* (2013.01); *H04L 5/005* (2013.01); *H04W 72/0446* (2013.01); *H04W 84/047* (2013.01); *H04W 88/04* (2013.01)

(58) Field of Classification Search
None
See application file for complete search history.

(56) References Cited

U.S. PATENT DOCUMENTS

| | | |
|---|---|---|
| 2007/0147326 A1 | 6/2007 | Chen |
| 2008/0095038 A1 | 4/2008 | Chang et al. |
| 2008/0107091 A1 | 5/2008 | Ramachandran |
| 2008/0220790 A1 | 9/2008 | Cai et al. |
| 2008/0310356 A1 | 12/2008 | Cai et al. |
| 2009/0034458 A1 | 2/2009 | Horn et al. |

(Continued)

FOREIGN PATENT DOCUMENTS

| | | |
|---|---|---|
| CN | 1852190 A | 10/2006 |
| CN | 101072065 A | 11/2007 |

(Continued)

OTHER PUBLICATIONS

3GPP TS 36.304 v8.4.0; 3rd Generation Partnership Project; Technical Specification Group Radio Access Network; Evolved Universal Terrestrial Radio Access (E-UTRA); User Equipment (UE) Procedures in Idle Mode; Release 8; Dec. 2008; 29 pgs.

(Continued)

*Primary Examiner* — Mohammad S Adhami
(74) *Attorney, Agent, or Firm* — Conley Rose, P.C.; J. Robert Brown, Jr.; Joseph J. Funston, III

(57) ABSTRACT

A method for informing a relay node when to receive data. The method includes the relay node being informed of a fixed point in a subframe of data when an access node will begin transmitting relevant data over a physical downlink shared channel. The method further includes the relay node beginning to receive data at approximately the fixed point.

30 Claims, 5 Drawing Sheets

(56) References Cited

U.S. PATENT DOCUMENTS

| | | | |
|---|---|---|---|
| 2009/0203383 | A1 | 8/2009 | Shen et al. |
| 2009/0207794 | A1 | 8/2009 | Meylan et al. |
| 2010/0074209 | A1 | 3/2010 | Montojo et al. |
| 2010/0080187 | A1 | 4/2010 | Papasakellariou et al. |
| 2010/0115355 | A1 | 5/2010 | Hsu |
| 2010/0120442 | A1* | 5/2010 | Zhuang et al. ............... 455/450 |
| 2010/0157927 | A1 | 6/2010 | Mochizuki et al. |
| 2010/0182939 | A1 | 7/2010 | Ojala et al. |
| 2010/0195629 | A1 | 8/2010 | Chen et al. |
| 2010/0246531 | A1 | 9/2010 | Chang et al. |
| 2010/0290411 | A1 | 11/2010 | Kim et al. |
| 2011/0096717 | A1* | 4/2011 | Kim et al. ..................... 370/315 |
| 2011/0122825 | A1 | 5/2011 | Lee et al. |
| 2011/0164584 | A1 | 6/2011 | Seo et al. |
| 2011/0194412 | A1* | 8/2011 | Park et al. ..................... 370/241 |
| 2011/0194485 | A1 | 8/2011 | Horneman et al. |
| 2011/0194523 | A1* | 8/2011 | Chung et al. ................. 370/329 |
| 2011/0222428 | A1 | 9/2011 | Charbit et al. |
| 2011/0250897 | A1* | 10/2011 | Seo et al. ...................... 455/445 |
| 2011/0268053 | A1 | 11/2011 | Che et al. |
| 2011/0317652 | A1 | 12/2011 | Kim et al. |
| 2012/0039239 | A1 | 2/2012 | Park et al. |
| 2012/0039263 | A1 | 2/2012 | Moberg et al. |
| 2012/0172044 | A1 | 7/2012 | Wu |
| 2013/0148551 | A1 | 6/2013 | Lindh et al. |
| 2013/0182679 | A1 | 7/2013 | Seo et al. |

FOREIGN PATENT DOCUMENTS

| | | |
|---|---|---|
| CN | 101146337 A | 3/2008 |
| EP | 1804430 A1 | 7/2007 |
| EP | 1804442 A1 | 7/2007 |
| EP | 1890445 A2 | 2/2008 |
| EP | 1919135 A2 | 5/2008 |
| EP | 1936828 A2 | 6/2008 |
| EP | 1940189 A2 | 7/2008 |
| EP | 1995980 A1 | 11/2008 |
| EP | 2020780 A1 | 2/2009 |
| JP | 2008104195 A | 5/2008 |
| JP | 2012503922 A | 2/2012 |
| KR | 20080089488 A | 10/2008 |
| WO | 2007133022 A1 | 11/2007 |
| WO | 2007148583 A1 | 12/2007 |
| WO | 2008020164 A1 | 2/2008 |
| WO | 2008036784 A2 | 3/2008 |
| WO | 2008057388 A1 | 5/2008 |
| WO | 2008103965 A1 | 8/2008 |
| WO | 2008125905 A2 | 10/2008 |
| WO | 2008133416 A1 | 11/2008 |
| WO | 2009001594 A1 | 12/2008 |
| WO | 2009018515 A1 | 2/2009 |
| WO | 2010077038 A2 | 7/2010 |

OTHER PUBLICATIONS

3GPP TS 36.331 v8.4.0; 3rd Generation Partnership Project; Technical Specification Group Radio Access Network; Evolved Universal Terrestrial Radio Access (E-UTRA) Radio Resource Control (RRC); Protocol Specification; Release 8; Dec. 2008; 198 pgs.

3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.

3GPP TR 36.913 v1.0.0; 3rd Generation Partnership Project; Technical Specification Group Radio Access Network; Requirements for Further Advancements for E-UTRA (LTE-Advanced) Release 8; May 2008; 13 pgs.

IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 117 pgs.; Part 1.

IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 101 pgs.; Part 2.

IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 96 pgs.; Part 3.

Texas Instruments; 3GPP TSG RAN WG1 #54bis; Title: Decode and Forward Relays for E-UTRA Enhancements; R1-083533; Prague, Czech Republic; Sep. 29-Oct. 3, 2008; 5 pgs.

Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pgs.

Ericsson; TSG-RAN WG1 #53; Title: A Discussion on Some Technology Components for LTE-Advanced; R1-082024; Kansas City, Missiouri; May 5-9, 2008; 11 pgs.

China Mobile, Vodafone, Huawei; TSG-RAN WG1 #54; Title: Application Scenarios for LTE-Advanced Relay; R1-082975; Jeju, Korea; Aug. 18-22, 2008; 7 pgs.

Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pgs.

QUALCOMM Europe; 3GPP TSG-RAN WG1 #54; Title: Operation of Relays in LTE-A; R1-083191; Jeju, S. Korea; Aug. 18-22, 2008; 5 pgs.

Motorola; TSG-RAN WG1 #54; Title: Classification of Relays; R1-083223; Jeju, South Korea; Aug. 18-22, 2008; 3 pgs.

Mitsubishi Electric; 3GPP TSG RAN WG1 #54 Meeting; Title: Basic Structure of Relaying under Multi-Antenna eNB; R1-082775; Jeju Island, Korea; Aug. 18-22, 2008; 4 pgs.

TSG-RAN WG1; 3GPP TSG RAN WG1 Meeting #55; Title: LS on Forward Compatibility Support in Rel-8; R1-084538; Prague, Czech Rep.; Nov. 10-14, 2008; 1 pg.

ZTE; TSG-RAN WG1 #56; Title: Control Signaling Structures for Relay Link; R1-090641; Athens, Greece; Feb. 9-13, 2009; 3 pgs.

Nortel; 3GPP TSG-RAN Working Group 1 Meeting #56; Title: Control Channel and Data Channel Design for Relay Link in LTE-Advanced; R1-090753; Athens, Greece; Feb. 9-13, 2009; 9 pgs.

RIML Internal Search Report; Title: Relay Research Overview; Authors: Sam Cai, Jim Womack, and Yi Yu; Oct. 26, 2008; 37 pgs.

Soldani, David et al.; Title: Wireless Relays for Broadband Access; IEEE Communications Magazine; Mar. 2008; pp. 58-66.

Pabst, Ralf et al.; Title: Relay-Based Deployment Concepts for Wireless and Mobile Broadband Radio; IEEE Communications Magazine; Sep. 2004; pp. 80-89.

Yu, Yi, et al.; U.S. Appl. No. 12/722,409, filed Mar. 11, 2010; Title: Relay Link Control Channel Design.

Yu, Yi et al.; U.S. Appl. No. 12/722,417, filed Mar. 11, 2010; Title: Resource Assignments for Relay System and Method.

PCT International Search Report; PCT Application No. PCT/US2010/027042; dated Jul. 26, 2010; 3 pgs.

PCT Written Opinion of the International Searching Authority; PCT Application No. PCT/US2010/027042; dated Jul. 26, 2010; 2 pgs.

PCT International Search Report; PCT Application No. PCT/US2010/027044; dated Aug. 4, 2010; 3 pgs.

PCT Written Opinion of the International Searching Authority; PCT Application No. PCT/US2010/027044; dated Aug. 4, 2010; 2 pgs.

PCT International Search Report; PCT Application No. PCT/US2010/027045; dated Aug. 3, 2010; 4 pgs.

PCT Written Opinion of the International Searching Authority; PCT Application No. PCT/US2010/027045; dated Aug. 3, 2010; 5 pgs.

PCT Written Opinion of the International Preliminary Examing Authority; PCT Application No. PCT/US2010/027042; dated Mar. 21, 2011; 5 pgs.

PCT Written Opinion of the International Preliminary Examing Authority; PCT Application No. PCT/US2010/027044; dated Mar. 21; 5 pgs.

PCT Written Opinion of the International Preliminary Examinig Authority; PCT Application No. PCT/US2010/027045; dated Mar. 21, 2011; 7 pgs.

PCT International Preliminary Report on Patentability; PCT Application No. PCT/US2010/027042; dated Jun. 16, 2011, 6 pgs.

(56) References Cited

OTHER PUBLICATIONS

PCT International Preliminary Report on Patentability; PCT Application No. PCT/US2010/027045; dated Jun. 16, 2011, 14 pgs.
PCT International Preliminary Report on Patentability; PCT Application No. PCT/US2010/027044; dated Jun. 20, 2011; 6 pgs.
Office Action dated Mar. 19, 2012; U.S. Appl. No. 12/722,409, filed Mar. 11, 2012; 23 pages.
Office Action dated Mar. 16, 2012; U.S. Appl. No. 12/722,417, filed Mar. 11, 2012; 18 pages.
3GPP TSG RAN WG1 Meeting #55bis; "Consideration on Resource Allocation for Relay Backhaul Link"; R1-090222; Ljubljana, Slovenia; Jan. 12-16, 2009; 5 pages.
TSG-RAN1 #55bis; "Control Channel and Data Channel Design for Relay Link in LTE-Advanced"; R1-090153; Ljubljana, Slovenia; Jan. 12-16, 2009; 17 pages.
3GPP RAN WG1 #55; "Support of Rel-8 Ues by LTE-A Relays"; R1-084384; Prague, Czech Republic; Nov. 10-14, 2008; 20 pages.
Office Action dated May 13, 2013; U.S. Appl. No. 12/722,409, filed Mar. 11, 2010; 37 pages.
Office Action dated May 9, 2013; U.S. Appl. No. 12/722,417, filed Mar. 11, 2012; 24 pages.
Japanese Office Action; Application No. 2011-554212; dated Feb. 21, 2013; 9 pages.
Korean Office Action; Application No. 10-2011-7024107; dated Apr. 30, 2013; 6 pages.
Australian Office Action; Application No. 2010224034; dated Apr. 18, 2013; 3 pages.
Mexican Office Action; Application No. MX/a/2011/009400; dated Mar. 14, 2013; 7 pages.
European Examination Report; Application No. 10709632.3; dated Apr. 22, 2013; 5 pages.
Japanese Office Action; Application No. 2011-554214; dated Apr. 9, 2013; 6 pages.
Korean Office Action; Application No. 10-2011-7024107; dated Oct. 29, 2012; 7 pages.
Mexican Office Action; Application No. MX/a/2011/009585; dated Oct. 11, 2012; 7 pages.
European Examination Report; Application No. 10709632.3; dated Dec. 4, 2012; 4 pages.
Final Office Action dated Aug. 21, 2013; U.S. App. No. 12/722,409, filed Mar. 11, 2010; 44 pages.
Final Office Action dated Sep. 6, 2013; U.S. Appl. No. 12/722,417, filed Mar. 11, 2012; 29 pages.
Canadian Office Action; Application No. 2,755,223; dated Jul. 26, 2013; 2 pages.
Chinese Office Action; Application No. 201080020736.5; dated Sep. 24, 2013; 17 pages.
Chinese Office Action; Application No. 201080020724.2; dated Oct. 10, 2013; 13 pages.
Chinese Office Action; Application No. 201080020738.4; dated Oct. 9, 2013; 22 pages.
European Examination Report; Application No. 10709632.3; dated Oct. 4, 2013; 3 pages.
Japanese Office Action; Application No. 2011-554214; dated Aug. 21, 2013; 10 pages.
3GPP TSG RAN WG1 Meeting #56; "Consideration on Resource Allocation for Relay Backhual Link"; R1-090790; 5 pages.
Office Action dated Nov. 14, 2013; U.S. Appl. No. 12/722,409, filed Mar. 11, 2010; 32 pages.
Advisory Action dated Nov. 18, 2013; U.S. Appl. No. 12/722,417, filed Mar. 11, 2010; 5 pages.
Japanese Office Action; Application No. 2011-554213; dated Jan. 8, 2014; 11 pages.
Canadian Office Action; Application No. 2,755,148; dated Nov. 25, 2013; 3 pages.
Japanese Final Office Action dated Jan. 14, 2014 as received in co-pending Japanese Application No. 2011-554214; 2 pages (No English Translation Available).
Final Office Action dated Jul. 18, 2012; U.S. Appl. No. 12/722,409, filed Mar. 11, 2012; 17 pages.
Final Office Action dated Jun. 28, 2012; U.S. Appl. No. 12/722,417, filed Mar. 11, 2012; 13 pages.
European Examination Report; Application No. 10709630.7; dated Jun. 28, 2012; 6 pages.
European Examination Report; Application No. 10709632.3; dated Jun. 28, 2012; 7 pages.
Notice of Allowance dated Apr. 25, 2014; U.S. Appl. No. 12/722,409, filed Mar. 11, 2010; 20 pages.
Chinese Office Action as Received in Co-pending Application No. 201080020736.5 dated May 9, 2014; 6 pages. (No English Translation available).
Chinese Office Action; Application No. 201080020724.2; dated Mar. 19, 2014; 7 pages.
Chinese Office Action as Received in Co-pending Application No. 201080020738.4 dated Apr. 22, 2014; 13 pages. (No English translation available).
Notice of Allowance dated Jul. 30, 2014; U.S. Appl. No. 12/722,409, filed Mar. 11, 2010; 12 pages.
Office Action dated Aug. 29, 2014; U.S. Appl. No. 12/722,417, filed Mar. 11, 2010; 35 pages.
Japanese Final Office Action as Received in Co-pending Application No. 2011-554213 dated Jun. 19, 2014; 3 pages. (No English translation available).
Advisory Action dated Jan. 27, 2015; U.S. Appl. No. 12/722,417, filed Mar. 11, 2010; 3 pages.
Chinese Office Action; Application No. 201080020736.5; dated Nov. 15, 2014; 16 pages.
Office Action dated Feb. 23, 2015; U.S. Appl. No. 12/722,417, filed Mar. 11, 2010; 21 pages.
Canadian Office Action; Application No. 2,755,223; dated May 12, 2015; 3 pages.
Yu, Yi, et al.; U.S. Appl. No. 14/980,612, filed Dec. 28, 2015; Title: Resouce Assignments for Relay System and Method; 26 pages.
Office Action dated Feb. 26, 2016; U.S. Appl. No. 14/980,612, filed Dec. 28, 2015; 39 pages.
Canadian Office Action; Application No. 2,755,326; dated Dec. 9, 2015; 3 pages.
Notice of Allowance dated Aug. 28, 2015; U.S. Appl. No. 12/722,417, filed Mar. 11, 2010; 23 pages.
Final Office Action dated Nov. 19, 2014; U.S. Appl. No. 12/722,417, filed Mar. 11, 2010; 20 pages.
Chinese Office Action; Application No. 201080020738.4; dated Oct. 10, 2014; 7 pages.
Advisory Action dated Sep. 26, 2016; U.S. Appl. No. 14/980,612, filed Dec. 28, 2015; 5 pages.
Indian Office Action; Application No. 6580/CHENP/2011; dated Feb. 13, 2017; 7 pages.
Final Office Action dated Jun. 10, 2016; U.S. Appl. No. 14/980,612, filed Dec. 28, 2015; 36 pages.
Advisory Action dated Aug. 18, 2016; U.S. Appl. No. 14/980,612, filed Dec. 28, 2015; 3 pages.

\* cited by examiner

RELAY RECEPTION SYNCHRONIZATION SYSTEM AND METHOD

CROSS-REFERENCE TO RELATED APPLICATIONS

The present application claims priority to U.S. Provisional Patent Application No. 61/160,158, filed Mar. 13, 2009, by Yi Yu, et al, entitled "Relay Reception Synchronization System and Method"; U.S. Provisional Patent Application No. 61/160,156, filed Mar. 13, 2009, by Yi Yu, et al, entitled "Relay Link Control Channel Design"; and U.S. Provisional Patent Application No. 61/160,163, filed Mar. 13, 2009, by Yi Yu, et al., entitled "Resource Assignments for Relay System and Method", all of which are incorporated by reference herein as if reproduced in its entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. An access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may be used serially to extend or enhance coverage created by an access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
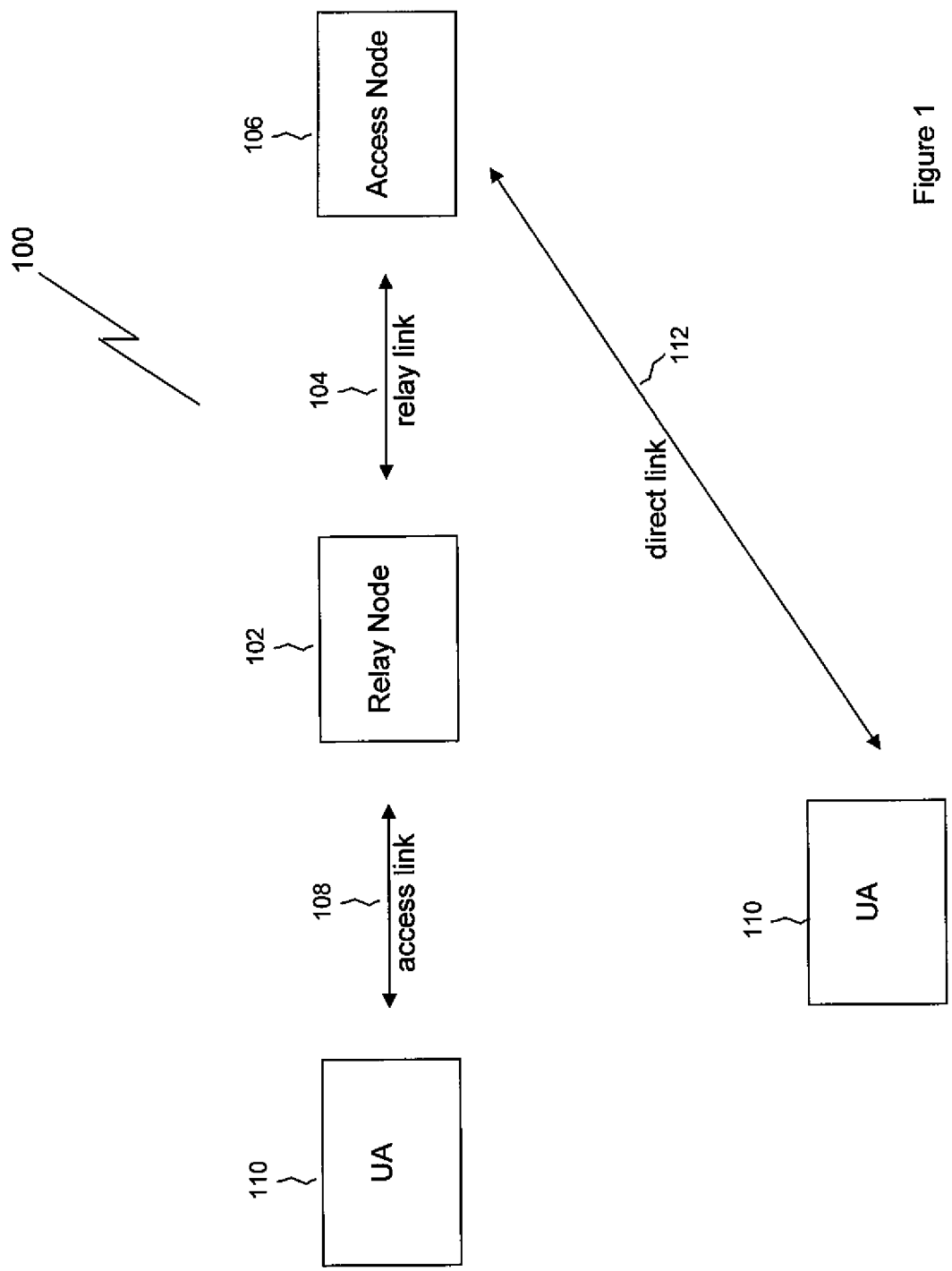
FIG. 1 is a diagram illustrating a wireless communication system that includes a relay node, according to an embodiment of the disclosure.

FIG. 1 is a diagram illustrating a wireless communication system 100 that includes a relay node 102, according to an embodiment of the disclosure. Examples of the wireless communication system 100 include LTE or LTE-Advanced (LTE-A) networks, and all of the disclosed and claimed embodiments could be implemented in an LTE-A network. LTE may be said to correspond to 3GPP Release 8 (Rel-8 or R8) and Release 9 (Rel-9 or R9) while LTE-A may be said to correspond to Release 10 (Rel-10 or R10) and possibly to releases beyond Release 10.

The relay node 102 can amplify or repeat a signal received from a UA 110 and cause the modified signal to be received at an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110.

The relay node 102 might be placed near the edges of a cell so that the UA 110 can communicate with the relay node 102 rather than communicating directly with the access node 106 for that cell. In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within a cell or to extend the size of coverage of a cell. Additionally, the use of a relay node 102 can enhance throughput of a signal within a cell because the UA 110 can access the relay node 102 at a higher data rate than the UA 110 might use when communicating directly with the access node 106 for that cell, thus creating higher spectrum efficiency. The use of a relay node 102 can also decrease the UA's battery usage by allowing the UA 110 to transmit at a lower power.

Relay nodes can be divided into three types: layer one relay nodes, layer two relay nodes, and layer three relay nodes. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node. The illustrative embodiments are primarily concerned with layer two or layer three relay nodes. Therefore, as used herein, the term "relay node" will not refer to layer one relay nodes, unless specifically stated otherwise.

When the UA 110 is communicating with the access node 106 via the relay node 102, the links that allow wireless communication can be said to be of three distinct types. The communication link between the UA 110 and the relay node 102 is said to occur over an access link 108. The communication between the relay node 102 and the access node 106 is said to occur over a relay link 104. Communication that passes directly between the UA 110 and the access node 106 without passing through the relay node 102 is said to occur over a direct link 112.

The access node 106 sends data to the relay node 102 in a series of subframes, each of which consists of a relatively shorter control region followed by a relatively longer data region. The control region, or physical downlink control channel (PDCCH), typically consists of one to four orthogonal frequency-division multiplexing (OFDM) symbols. The data region, or physical downlink shared channel (PDSCH), can be considerably longer. The relay node 102 sends data to the UA 110 in a similar format.

Under current configurations, the relay node 102 transmits control data to the UA 110 at the same time that the access node 106 is transmitting control data to the relay node 102. However, the relay node 102 typically cannot transmit and receive data at the same time. Therefore, the relay node 102 may not receive the control information that is transmitted by the access node 106 while the relay node 102 is transmitting control information to the UA 110. A portion of the control information that the access node 106 transmits might specify the size of that control information, that is, the size of the PDCCH region. Since the relay node 102 might not receive this information, the relay node 102 may not know when PDCCH data ends and PDSCH data begins. The relay node 102 simply begins listening for the PDSCH data from the access node 106 upon completing the transmission of control information to the UA 110. It is possible that the time when the relay node 102 starts to listen for PDSCH data from the access node 106 may not coincide with the time when the access node 106 starts to transmit PDSCH data. This might cause the relay node 102 to miss a portion of the PDSCH data or to listen for PDSCH data while the access node 106 is still sending PDCCH data.

Figure 2A:
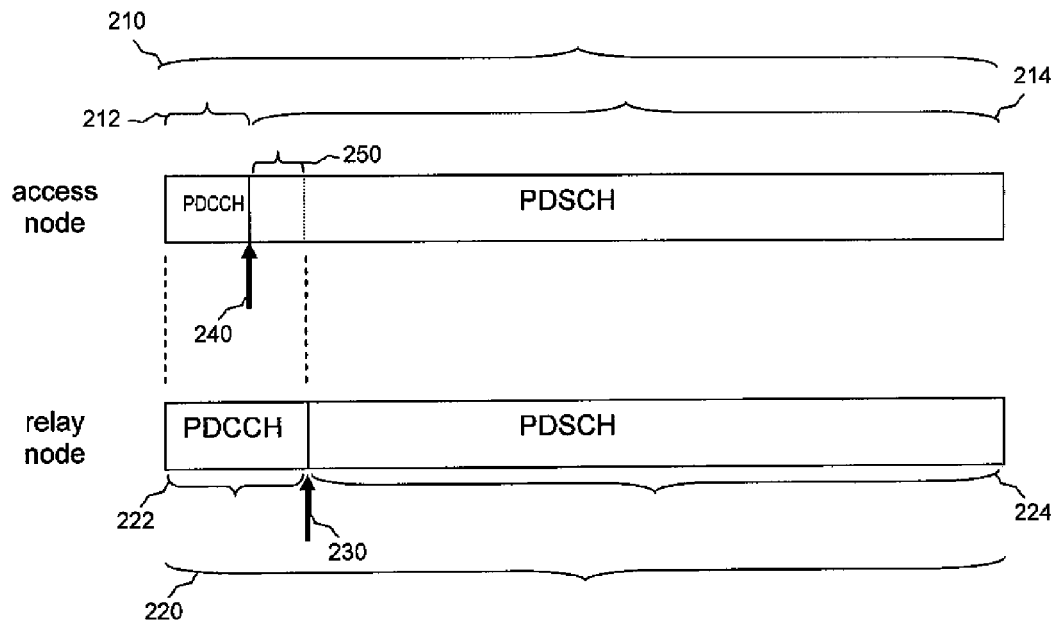
FIG. 2a is a diagram illustrating an access node control region that is smaller than a corresponding relay node control region.

FIG. 2a illustrates one such scenario. A subframe 210 of data sent from the access node 106 to the relay node 102 consists of a PDCCH region 212 and a PDSCH region 214. Similarly, a subframe 220 of data sent from the relay node 102 to the UA 110 consists of a PDCCH region 222 and a PDSCH region 224. The PDCCH region 212 and the PDSCH region 214 in the subframe 210 sent from the access node 106 are not necessarily the same as the PDCCH region 222 and the PDSCH region 224 in the subframe 220 sent from the relay node 102. To distinguish between these regions, the PDCCH region 212 and the PDSCH region 214 in the subframe 210 will hereinafter be referred to as the access node PDCCH region 212 and the access node PDSCH region 214, respectively. The PDCCH region 222 and the PDSCH region 224 in the subframe 220 will hereinafter be referred to as the relay node PDCCH region 222 and the relay node PDSCH region 224, respectively.

The relay node 102 is configured to send the information in the relay node PDCCH region 222 to the UA 110 at approximately the same time that the access node 106 is sending the information in the access node PDCCH region 212 to the relay node 102. In the example of FIG. 2a, the relay node PDCCH region 222 is larger than the access node PDCCH region 212. For example, the relay node PDCCH region 222 might consist of two OFDM symbols, while the access node PDCCH region 212 might consist of only one OFDM symbol.

Since the relay node 102 cannot receive the information in the access node PDCCH region 212 while it is transmitting the information in the relay node PDCCH region 222, the relay node 102 does not receive any information regarding the size of the access node PDCCH region 212. The relay node 102 simply begins listening for the data in the access node PDSCH region 214 at the point 230 where the relay node 102 finishes sending the information in the relay node PDCCH region 222. However, the access node 106 actually began transmitting the data in the access node PDSCH region 214 at the point 240 where the access node 106 finished sending the information in the access node PDCCH region 212. That is, the access node 106 began sending the data in the access node PDSCH region 214 before the relay node 102 began listening for the data in the access node PDSCH region 214. This causes the relay node 102 to miss a portion 250 of the data in the access node PDSCH region 214.

Figure 2B:
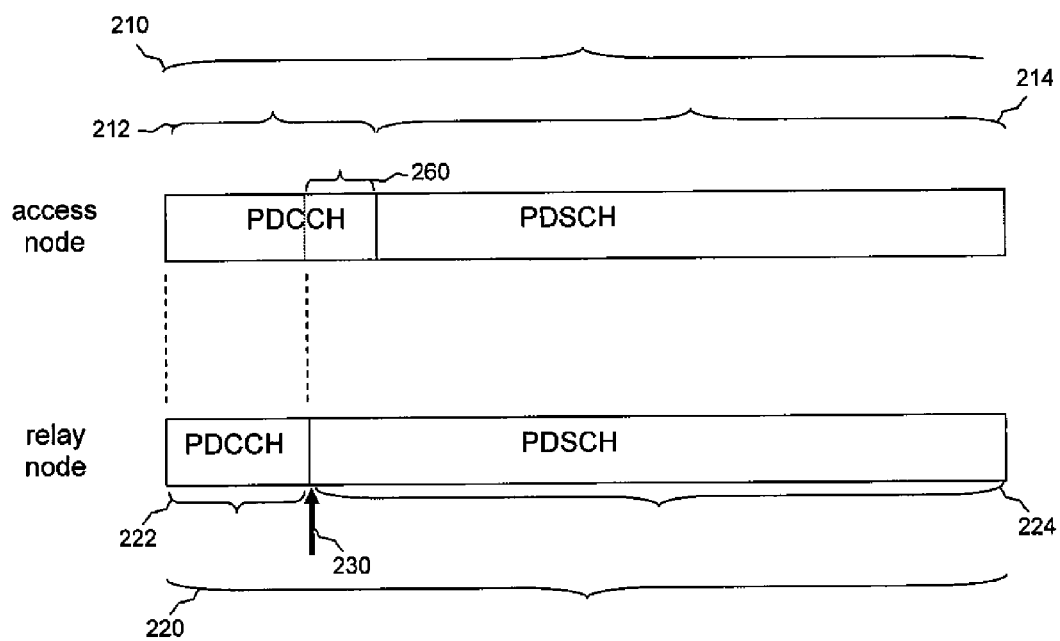
FIG. 2b is a diagram illustrating an access node control region that is larger than a corresponding relay node control region.

FIG. 2b illustrates another scenario. In this case, the relay node PDCCH region 222 is smaller than the access node PDCCH region 212. For example, the relay node PDCCH region 222 might consist of two OFDM symbols, while the access node PDCCH region 212 might consist of three OFDM symbols. The relay node 102 again begins listening for the data in the access node PDSCH region 214 at the point 230 where the relay node 102 completes transmitting the information in the relay node PDCCH region 222. In this scenario, however, the access node 106 is still transmitting PDCCH information at point 230. Therefore, the relay node 102 will begin listening for PDSCH data before any PDSCH data is being transmitted. The relay node 102 might be able to ignore the portion 260 of PDCCH information that is received when PDSCH data is expected, but listening for and decoding this information may be a waste of resources.

In yet another scenario (not shown), the relay node PDCCH region 222 and the access node PDCCH region 212 are the same size. In this case, the relay node 102 will begin listening for the data in the access node PDSCH region 214 at approximately the same time that the access node 106 begins transmitting the data in the access node PDSCH region 214. However, due to relay switching delays as the relay node 102 changes from a transmission mode to a reception mode, the relay node 102 might still miss a portion of the PDSCH data.

In various embodiments, the access node 106 informs the relay node 102 when to start listening for PDSCH data. In one embodiment, the size of the access node PDCCH region 212 is fixed, the access node 106 informs the relay node 102 of this size, and the relay node 102 starts listening for PDSCH data at the fixed endpoint of the PDCCH information. In another embodiment, the size of the access node PDCCH region 212 is variable, and the access node 106 informs the relay node 102 to start listening for PDSCH data at a point that is beyond the endpoint of the largest possible access node PDCCH region.

Figure 3A:
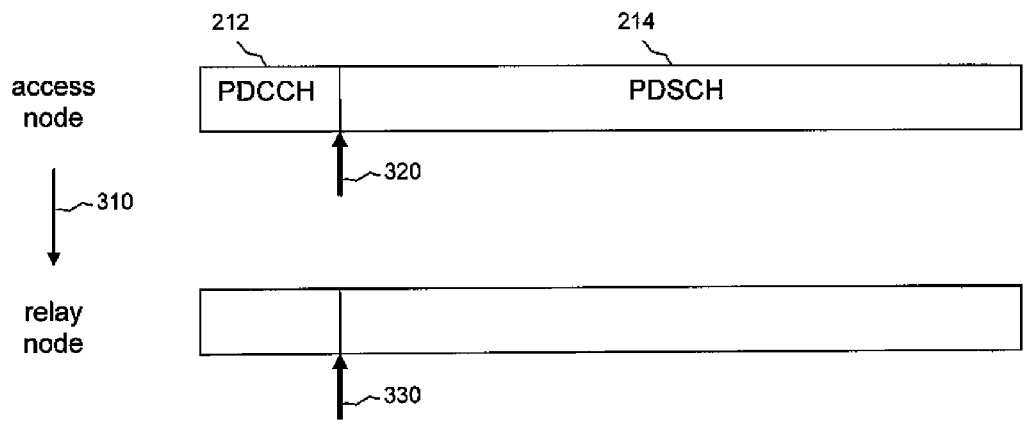
FIG. 3a is a diagram of a subframe of data with a fixed start point for PDSCH data according to an embodiment of the disclosure.

FIG. 3a illustrates the first of these embodiments. In this case, the size of the access node PDCCH region 212 is fixed in the subframes in which the access node 106 transmits data to the relay node 102, for example, in the Multicast/Broadcast Single Frequency Network (MBSFN) subframes. This can be contrasted with the cases in FIGS. 2a and 2b and with subframes other than MBSFN subframes, where the access node PDCCH region 212 is dynamic and could possibly change from subframe to subframe.

For example, the access node PDCCH region 212 might be set to two OFDM symbols for every subframe that the access node 106 sends to the relay node 102. In other cases, other sizes of the access node PDCCH region 212 could be set. The access node 106 can transmit the size of the access node PDCCH region 212 to the relay node 102 in high layer signaling 310. That is, this size information is not transmitted in the PDCCH. For example, the access node 106 might transmit the size information in the broadcast control channel (BCCH), in radio resource control (RRC) signaling, as a media access control (MAC) control element, or in some other high layer signal 310.

Another possibility is that this size information is pre-configured or preset to, for example, two or three OFDM symbols. In this case, no signaling is needed. In this embodiment, the size of the access node PDCCH region 212 is not less than the size of the relay node PDCCH region 222. For example, if the relay node PDCCH region 222 is two OFDM symbols, the size of the access node PDCCH region 212 would be no less than two OFDM symbols.

Upon learning the size of the access node PDCCH region 212, the relay node 102 knows the fixed point 320 at which the access node 106 will stop sending PDCCH information and begin sending PDSCH data. The relay node 102 then knows to begin listening for PDSCH data from the access node 106 at a corresponding point 330.

In some cases, the access node 106 might indicate a size that is slightly smaller than the actual size of the access node PDCCH region 212. This can cause the relay node 102 to begin listening for PDSCH data at a time slightly before the PDSCH data actually starts to be transmitted. This, in turn, can compensate for any relay switching delays and prevent the relay node 102 from missing any PDSCH data that might be sent while the relay node 102 is in transition from a transmitting mode to a receiving mode.

Alternatively, the access node 106 might send the relay node 102 the actual size of the access node PDCCH region 212, but the relay node 102 might begin listening for PDSCH data at a point 330 that is slightly before the point 320 when the access node PDCCH region 212 ends. This could again compensate for switching delays and ensure that the relay node 102 receives all of the PDSCH data.

Figure 3B:
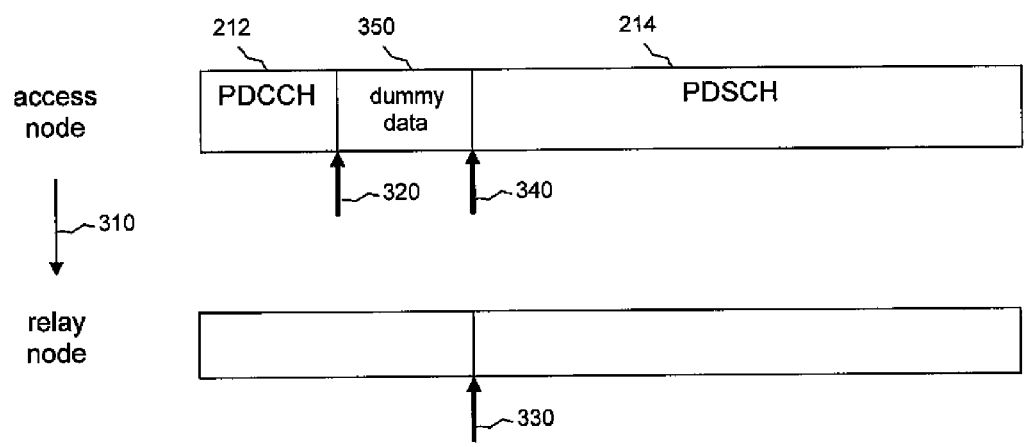
FIG. 3b is a diagram of a subframe of data with a fixed start point for PDSCH data according to an alternative embodiment of the disclosure.

FIG. 3b illustrates an alternative embodiment. In this case, the sizes of the access node PDCCH region 212 and the access node PDSCH region 214 are flexible. If one of the regions becomes larger, the other region becomes correspondingly smaller, with the sum of their sizes remaining equal to the size of the subframe 210. Although these data region sizes can vary, the point at which the access node 106 begins transmitting relevant PDSCH data to the relay node 102 is fixed. In an embodiment, the access node 106 begins transmitting PDSCH data at a fixed point 340 that occurs after the latest point 320 at which the access node 106 could transmit PDCCH data.

For example, if the size of the access node PDCCH region 212 could vary in a range from one to four OFDM symbols, the access node 106 might begin transmitting PDSCH data at the fifth or sixth OFDM symbol of the subframe 210. If the size of the access node PDCCH region 212 could vary in a range from one to three OFDM symbols, the access node 106 might begin transmitting PDSCH data at the fourth or fifth OFDM symbol of the subframe 210, and so on. The access node 106 knows the latest possible endpoint for the variable-length PDCCH information and begins transmitting relevant PDSCH data to the relay node 102 at a fixed point beyond this endpoint.

The access node 106 can use high layer signaling 310, as described above, to inform the relay node 102 of the point 340 where the access node 106 will begin transmitting PDSCH data. The relay node 102 can then begin listening for the PDSCH data at a corresponding point 330. Similar to the embodiment described above, in order to compensate for switching delay, either the access node 106 or the relay node 102 might create a slight offset between the point 330 where the relay node begins listening for PDSCH data and the point 340 where the access node begins sending PDSCH data.

In this embodiment, a gap may exist between the point 320 where the access node 106 stops transmitting PDCCH information and the point 340 where the access node 106 begins transmitting actual PDSCH data. In an embodiment, the access node 106 has the capability to fill in this gap with dummy data 350. That is, the PDCCH region 212 still ends at point 320 and the PDSCH region 214 still begins at point 320. However, the portion of the PDSCH region 214 between point 320 and point 340 contains dummy PDSCH data 350 that is irrelevant to the relay node 102. Transmission of actual PDSCH data that is relevant to the relay node 102 does not begin until point 340.

Figure 4:
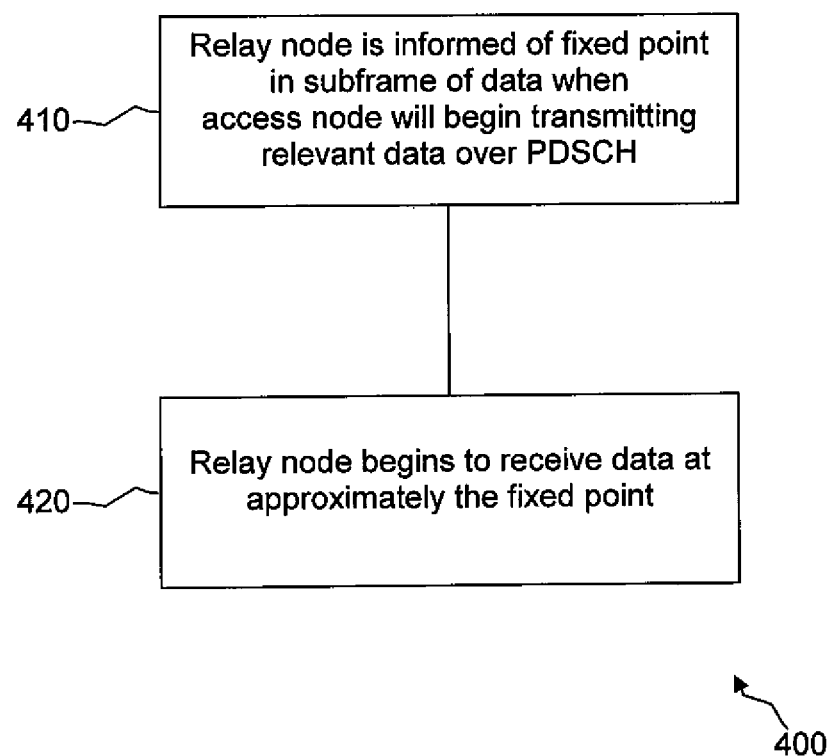
FIG. 4 is a block diagram of a method for informing a relay node when to receive data according to an embodiment of the disclosure.

FIG. 4 illustrates an embodiment of a method 400 for informing a relay node when to receive data. In block 410, the relay node is informed of a fixed point in a subframe of data when an access node will begin transmitting relevant data over a physical downlink shared channel. In block 420, the relay node begins to receive data at approximately the fixed point.

Figure 5:
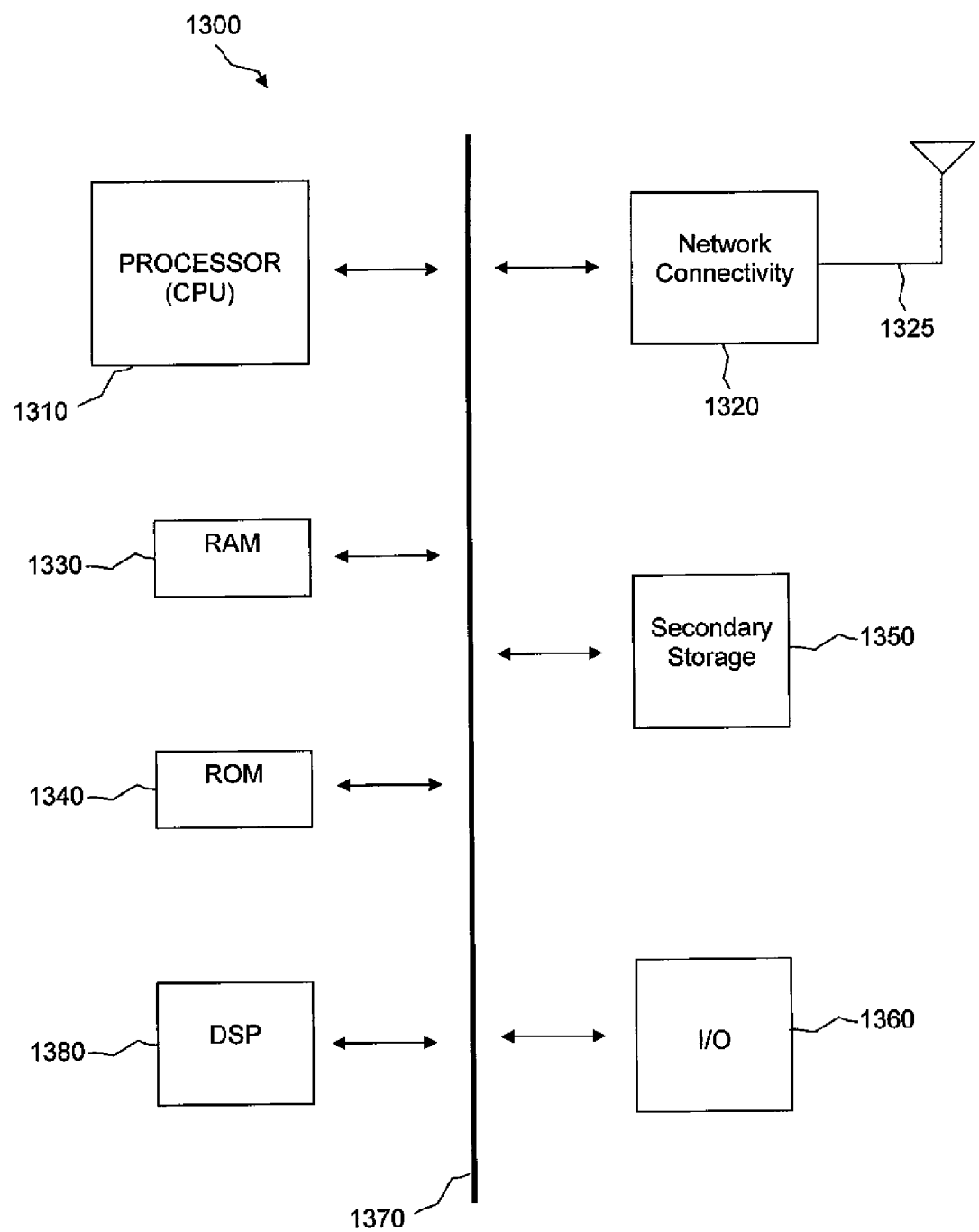
FIG. 5 illustrates a processor and related components suitable for implementing the several embodiments of the present disclosure.

The UA 110 and other components described above might include a processing component that is capable of executing instructions related to the actions described above. FIG. 5 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for informing a relay node when to receive data. The method includes the relay node being informed of a fixed point in a subframe of data when an access node will begin transmitting relevant data over a physical downlink shared channel. The method further includes the relay node beginning to receive data at approximately the fixed point.

In another embodiment, an access node in a wireless telecommunications system is provided. The access node includes a processor configured such that the access node transmits to a relay node information related to a fixed point in a subframe of data at which the access node will begin transmitting relevant physical downlink shared channel data.

In another embodiment, a relay node in a wireless telecommunications system is provided. The relay node includes a processor configured such that the relay node receives from an access node information related to a fixed point in a subframe of data at which the access node will begin transmitting relevant physical downlink shared channel data. The processor is further configured to begin to receive data at approximately the fixed point.

The following are incorporated herein by reference for all purposes: 3rd Generation Partnership Project (3GPP) Technical Specification (TS) 36.813 and 3GPP TS 36.814.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for operating a relay node in a wireless communications network including an access node configured to transmit control information in an access node physical downlink control channel (PDCCH) region, the method comprising:
   transmitting, by the relay node, control data to a user equipment (UE) in the network over a relay node PDCCH in a subframe, wherein the relay node is configured to have information on a single fixed point in the subframe for the access node to begin to transmit data to the relay node over an access node physical downlink shared channel (PDSCH) in the subframe; and
   beginning, by the relay node, to receive data over the access node PDSCH at or before the single fixed point in the subframe, wherein the single fixed point is the only starting location at or before which the relay node attempts to begin receiving data transmitted from the access node over the access node PDSCH after transmitting control data to the UE over the relay node PDCCH in the subframe, wherein the relay node PDCCH is located in a first Orthogonal Frequency-Division Multiplexing (OFDM) symbol of the subframe and wherein the single fixed point is during a second OFDM symbol of the subframe.

2. The method of claim 1, further comprising:
   receiving, by the relay node, the information on the single fixed point via high layer signaling; and
   using, by the relay node, the information on the single fixed point such that the relay node detects data transmitted by the access node without blindly decoding the access node PDSCH of the subframe.

3. The method of claim 2, wherein the high layer signaling comprises using at least one of:
   a broadcast control channel;
   radio resource control (RRC) signaling; or
   a media access control (MAC) control element.

4. The method of claim 1, wherein the single fixed point is pre-configured or preset, and wherein the relay node receives no signaling for the information on the single fixed point from the access point.

5. The method of claim 1, further comprising, receiving, by the relay node, dummy data in at least a portion of the access node PDSCH, wherein the portion is between a point where the access node stops transmitting control information over the access node PDCCH region and begins transmitting actual PDSCH data to the relay node in the access node PDSCH of the subframe.

6. The method of claim 1, wherein beginning to receive the data comprises beginning to listen for the data at a point in time that is earlier than the single fixed point by an amount of time corresponding to a relay switching delay.

7. The method of claim 1, wherein the size of the access node PDCCH region comprises one OFDM symbol.

8. The method of claim 1, wherein the access node is configured to transmit the control information during a first duration in the subframe, and wherein transmitting, by the relay node, the control data comprises transmitting, by the relay node, the control data during a second duration in the subframe transmitted from the access node, the second duration overlapping at least partially with the first duration.

9. An access node in a wireless telecommunications system, the access node comprising:
   a processor configured such that the access node transmits control information in an access node physical downlink control channel (PDCCH) region,
   wherein the processor is further configured such that the access node transmits, to a relay node, information on a single fixed point in a subframe for the access node to begin to transmit data to the relay node over an access node physical downlink shared channel (PDSCH) in the subframe, and
   wherein the access node is configured to transmit the information on the single fixed point via high layer signaling, wherein the information on the single fixed point instructs the relay node that the single fixed point is the only starting location at or before which the relay node is to begin listening for data transmitted over the access node PDSCH after transmitting control data over a relay node PDCCH in the subframe, wherein the relay node PDCCH is located in a first Orthogonal Frequency-Division Multiplexing (OFDM) symbol of the subframe and wherein the single fixed point is during a second OFDM symbol of the subframe.

10. The access node of claim 9, wherein the high layer signaling comprises using at least one of:
    a broadcast control channel;
    radio resource control (RRC) signaling; or
    a media access control (MAC) control element.

11. The access node of claim 9, wherein the size of the access node PDCCH region comprises one OFDM symbol.

12. The access node of claim 11, wherein, irrespective of the size of the access node PDCCH region, the access node transmits the data to the relay node starting at the second OFDM symbol of the subframe.

13. The access node of claim 9, wherein the access node is further configured to transmit dummy data to the relay node in at least a portion of the access node PDSCH of the subframe, wherein the portion is between the endpoint of the access node PDCCH region and a point where the access node begins transmitting actual PDSCH data in the access node PDSCH of the subframe.

14. The access node of claim 9, wherein the access node is further configured to inform the relay node to begin to receive data at a point in time before the single fixed point in order to compensate for delay resulting from the relay node transitioning from a transmission mode to a reception mode.

15. A relay node in a wireless telecommunications system including an access node configured to transmit control information in an access node physical downlink control channel (PDCCH) region, the relay node comprising:
   a processor configured such that the relay node transmits control data to a user equipment in the system over a relay node PDCCH in a subframe,
   wherein the relay node is configured to have information on a single fixed point in a subframe for the access node to begin to transmit data to the relay node over an access node physical downlink shared channel (PDSCH) in the subframe,
   wherein the single fixed point is the only starting location at or before which the relay node attempts to begin receiving data from the access node over the access node PDSCH in the subframe after transmitting control data to the UE over the relay node PDCCH in the subframe, wherein the relay node PDCCH is located in a first Orthogonal Frequency-Division Multiplexing (OFDM) symbol of the subframe and wherein the single fixed point is during a second OFDM symbol of the subframe.

16. The relay node of claim 15, wherein the relay node is further configured to receive the information on the single fixed point via high layer signaling.

17. The relay node of claim 16, wherein the high layer signaling comprises using at least one of:
   a broadcast control channel;
   radio resource control (RRC) signaling; or
   a media access control (MAC) control element.

18. The relay node of claim 15, wherein the single fixed point is pre-configured or preset, and wherein the relay node is configured to receive no signaling for the information on the single fixed point from the access point.

19. The relay node of claim 15, wherein the relay node is further configured to receive dummy data in at least a portion of the access node PDSCH of the subframe, wherein the portion is between the endpoint of the access node PDCCH region and a point where the access node begins transmitting actual PDSCH data in the access node PDSCH of the subframe.

20. The relay node of claim 15, wherein the relay node is configured to begin to receive the data transmitted from the access node at a point in time that is earlier than the single fixed point by an amount of time corresponding to a relay switching delay.

21. The relay node of claim 15, wherein the size of the access node PDCCH region comprises one OFDM symbol.

22. The relay node of claim 15, wherein the access node is configured to transmit the control information during a first duration, and
   wherein the relay node is configured to transmit the control data during a second duration, the second duration overlapping at least partially with the first duration.

23. A method for operating a relay node in a wireless communications network including an access node and user equipment, the method comprising:
   receiving, by the relay node, control information from the access node, wherein the control information is received over an access node physical downlink control channel (PDCCH);
   transmitting, by the relay node, control data to the user equipment over a relay node PDCCH in a subframe, wherein the relay node is configured to have information on a single fixed point for the access node to begin to transmit data to the relay node over an access node physical downlink shared channel (PDSCH) in the subframe; and
   beginning, by the relay node, to receive data over the access node PDSCH at or before the single fixed point in the subframe, wherein the single fixed point is during a second Orthogonal Frequency-Division Multiplexing (OFDM) symbol of the subframe, wherein the second OFDM symbol is the only starting location at or before which the relay node attempts to begin receiving data transmitted over the access node PDSCH after transmitting the control data to the UE over the relay node PDCCH in the subframe.

24. The method of claim 23, wherein the size of the access node PDCCH comprises one OFDM symbol, and
   wherein at least a portion of the second OFDM symbol in the subframe contains dummy PDSCH data that is irrelevant to the relay node, wherein the portion is between a point where the access node stops transmitting information over the access node PDCCH region and begins transmitting actual PDSCH data to the relay node in the access node PDSCH of the subframe.

25. The method of claim 4, wherein the size of the access node PDCCH region in which the control information is transmitted from the access node is not less than the size of the relay node PDCCH in the subframe transmitted from the relay node.

26. The method of claim 5, wherein the access node PDCCH region in which the control information is transmitted from the access node is not the same as the relay node PDCCH in the subframe transmitted from the relay node.

27. The relay node of claim 18, wherein the size of the access node PDCCH region in which the control information is transmitted from the access node is not less than the size of the relay node PDCCH in the subframe transmitted from the relay node.

28. The relay node of claim 19, wherein the access node PDCCH region in which the control information is transmitted from the access node is not the same as the relay node PDCCH in the subframe transmitted from the relay node.

29. The method of claim 1, wherein the access node informs the relay node to begin listening for PDSCH data at a point that is beyond the endpoint of the largest possible access node PDCCH region in which the control information is transmitted from the access node.

30. The method of claim 1, wherein the relay node PDCCH has a fixed endpoint.

* * * * *